United States Patent
Zhang et al.

(10) Patent No.: US 12,035,300 B2
(45) Date of Patent: Jul. 9, 2024

(54) CONTROL INFORMATION SENDING METHOD AND RECEIVING METHOD, TERMINAL, AND NETWORK SIDE DEVICE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Yi Zhang, Beijing (CN); Liang Xia, Beijing (CN); Qixing Wang, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 438 days.

(21) Appl. No.: 17/421,746

(22) PCT Filed: Jan. 10, 2020

(86) PCT No.: PCT/CN2020/071375
§ 371 (c)(1),
(2) Date: Jul. 9, 2021

(87) PCT Pub. No.: WO2020/143755
PCT Pub. Date: Jul. 16, 2020

(65) Prior Publication Data
US 2022/0104218 A1 Mar. 31, 2022

(30) Foreign Application Priority Data
Jan. 11, 2019 (CN) .......................... 201910028414.8

(51) Int. Cl.
*H04W 56/00* (2009.01)
*H04L 1/1812* (2023.01)
(Continued)

(52) U.S. Cl.
CPC ....... *H04W 72/1263* (2013.01); *H04L 1/1812* (2013.01); *H04W 72/0446* (2013.01); *H04W 72/21* (2023.01)

(58) Field of Classification Search
CPC ............. H04W 72/1263; H04W 72/21; H04W 72/0446; H04L 1/1812
(Continued)

(56) References Cited

U.S. PATENT DOCUMENTS

2018/0324882 A1  11/2018 Gulati et al.
2019/0342839 A1*  11/2019 Shao ..................... H04L 1/1861
(Continued)

FOREIGN PATENT DOCUMENTS

| CN | 106793092 A | 5/2017 |
| CN | 107925906 A | 4/2018 |

(Continued)

OTHER PUBLICATIONS

"Zhong, A Sending And Receiving Method Of Uplink Control Information, Terminal And Network Device, Apr. 29, 2022, CN 109787712" (Year: 2017).*
(Continued)

*Primary Examiner* — Sai Ming Chan
(74) *Attorney, Agent, or Firm* — Cooper Legal Group, LLC

(57) ABSTRACT

The present application provides a control information sending method and receiving method, a terminal, and a network side device. The method comprises: receiving sidelink feedback control information (SFCI) sent by at least one second
(Continued)

terminal; and sending uplink control information over first uplink resources according to the received SFCI.

15 Claims, 7 Drawing Sheets

(51) Int. Cl.
  *H04W 72/0446* (2023.01)
  *H04W 72/1263* (2023.01)
  *H04W 72/21* (2023.01)
(58) Field of Classification Search
  USPC .......................................................... 270/329
  See application file for complete search history.

(56) References Cited

U.S. PATENT DOCUMENTS

2021/0127364 A1* 4/2021 Panteleev ............. H04L 1/1819
2022/0095277 A1* 3/2022 Aiba ..................... H04W 72/20

FOREIGN PATENT DOCUMENTS

| CN | 108322414 A | 7/2018 |
| CN | 108631968 A | 10/2018 |
| CN | 109075955 A | 12/2018 |
| WO | 2017126266 A1 | 7/2017 |
| WO | 2018080565 A1 | 5/2018 |
| WO | 2018190617 A1 | 10/2018 |
| WO | 2018202798 A1 | 11/2018 |

OTHER PUBLICATIONS

"Sidelink Physical Layer Structure for NR V2X", Nov. 2018, 3GPP TSG RAN WG1 Meeting #95, R1-1812206, Spokane, USA, Source: Huawei, HiSilicon, 12 pgs.
"Frame and Slot Structure for Sidelink", Nov. 2018, 3GPP TSG RAN WG1 Meeting #95, R1-1813552, Spokane, USA, Source: Huawei, HiSilicon, 4 pgs.
"Resource Sharing between PDCCH and PDSCH", Sep. 2017, 3GPP TSG RAN WG1 Meeting AH_NR#3, R1-1716199, Nagoya, Japan, Source: MediaTek Inc., 3 pgs.
"Uu-based Sidelink Resource Allocation/configuration", Nov. 2018, Source: CMCC, 3GPP TSG RAN WG1 Meeting #95, R1-1812881, Spokane, USA, 7 pgs.
"Sidelink physical layer procedures for NR V2X", Nov. 2018, Source: Huawei, HiSilicon, 3GPP TSG RAN WG1 Meeting #95 R1-1812205,Spokane, USA, 12 pgs.
International Search Report in the international application No. PCT/CN2020/071375, mailed on Apr. 1, 2020, 2 pgs.
English translation of the Written Opinion of the International Search Authority in the international application No. PCT/CN2020/071375, mailed on Apr. 1, 2020, 4 pgs.
"Physical Layer Procedures, Jun. 2017, 3rd generation Partnership Project; Technical Specification Group Radio Access Network; Evolved Universal Terrestrial Radio Access (E-UTRA)", Jun. 2017, 3GPP TS 36.213 V14.3.0, 460 pgs.
Final Report of 3GPP TSG RAN WG1 #94 v1.0.0, Oct. 2018, Source: MCC Support, 3GPP TSG RAN WG1 Meeting #94bis, R1-1810051, Chengdu, China, 195 pgs.
"Final Report of 3GPP TSG RAN WG1 #94bis v1.0.0", Nov. 2018, Source: MCC Support, 3GPP TSG RAN WG1 Meeting #95, R1-1812101, Spokane, USA, 198 pgs.
"Support for Sidelink Unicast, Groupcast and Broadcast", Oct. 2018, Source: Huawei, HiCilicon, 3GPP TSG RAN WGI Meeting #94bis, R1-1810137, Chengdu, China, 9 pgs.
"Physical Layer Procedure for NR-V2X", Nov. 2018, Source: OPPO, 3GPP TSG RAN WG! Meeting #95; R1-1812811, Spokane, USA, 5 pgs.
"Consideration on Physical Layer Procedures", Nov. 2018, Source: Spreadtrum Communications, 3GPP TSG RAN WG1 Meeting #95, R1-1813075, Spokane, USA, 5 pgs.
"Discussion on HARQ Feedback", Jan. 2019, Source: CMCC, 3GPP TSG RAN WG1 Ad-Hoc Meeting 1901, R1-1900405, Taipei, 4 pgs.
Supplementary European Search Report in the European application No. 20739045.1, mailed on Feb. 8, 2022, 12 pgs.

* cited by examiner

CONTROL INFORMATION SENDING METHOD AND RECEIVING METHOD, TERMINAL, AND NETWORK SIDE DEVICE

CROSS-REFERENCE TO RELATED APPLICATION

This application claims priority to Chinese patent application No. 201910028414.8 filed on Jan. 11, 2019, the disclosure of which is hereby incorporated by reference in its entirety.

TECHNICAL FIELD

The disclosure relates to the technical field of communication, and particularly to a method for sending control information, a method for receiving control information, a terminal, and a network-side device.

BACKGROUND

New Radio (NR) Vehicle to Everything (V2X) supports two resource selection modes:
mode 1: a base station schedules a resource for sidelink transmission; and
mode 2: a user determines the resource for sidelink transmission.

NR V2X also defines Sidelink Control Information (SCI) for transmission on a Physical Sidelink Control Channel (PSCCH), and supports at least one SCI format to schedule and demodulate a corresponding PSCCH.

Hybrid Automatic Repeat reQuest (HARQ) feedback is concluded as follows.

For unicast and multicast, physical-layer sidelink HARQ feedback and combination are supported; and Sidelink Feedback Control Information (SFCI) is defined, at least one SFCI format is included, including HARQ-Acknowledgment (HARQ-ACK) information for a corresponding Physical Sidelink Shared Channel (PSSCH), and whether one or more of an ACK, a Negative Acknowledgment (NACK), and Discontinuous Transmission (DTX) are included is further researched. However, for mode 1, whether or how to carry SFCI in an uplink needs to be further studied.

SUMMARY

An object of embodiments of the disclosure is to provide a method for sending control information, a method for receiving control information, a terminal, and a network-side device, to solve the problem of whether or how to report SFCI to a network-side device.

To solve the problem, the embodiments of the disclosure provide a method for sending control information, which is applied to a first terminal and includes the following operations.

SFCI is received from at least one second terminal.

Uplink control information is sent on a first uplink resource according to the received SFCI.

The uplink control information may include at least one of:
the received SFCI;
first information generated according to the received SFCI and indicating whether the second terminal correctly receives sidelink data sent by the first terminal;
a Buffer Status Report (BSR) carrying the received SFCI; or
a Scheduling Request (SR).

The method may further include the following operation.

The first uplink resource is determined according to at least one of the following information:
slot information indicating a number of gap slots between a slot used for the uplink control information and a target slot, the target slot being a slot used by the first terminal to receive physical-layer downlink control signaling for scheduling data transmission from the first terminal to the second terminal, or a slot used by the first terminal to send SCI, or a slot used by the first terminal to send the sidelink data, or a slot used by the first terminal to receive the SFCI from the second terminal;
symbol information indicating a symbol occupied by the uplink control information in the occupied slot;
resource block information indicating a Physical Resource Block (PRB) occupied by the uplink control information in the occupied slot;
format information indicating a Physical Uplink Control Channel (PUCCH) format available for the uplink control information; or
PUCCH resource information indicating an Identity (ID) of a PUCCH resource occupied by the uplink control information.

The operation that the first uplink resource is determined according to at least one of the following information may include the following operations.

An available value set of at least one piece of information is determined according to a protocol or a configuration of high-layer signaling sent by a network-side device.

Physical-layer downlink control signaling sent by the network-side device is received, the physical-layer downlink control signaling indicating an available value in the available value set configured by the high-layer signaling or predetermined in the protocol.

The first uplink resource is determined according to the available value indicated by the physical-layer downlink control signaling.

The operation that the first uplink resource is determined according to at least one of the following information may include the following operation.

An available value of the at least one piece of information is determined according to a target resource, and the first uplink resource is determined according to the determined available value.

The target resource may include one of:
a resource used by the first terminal to receive the physical-layer downlink control signaling for scheduling data transmission from the first terminal to the second terminal;
a resource used by the first terminal to send the SCI;
a resource used by the first terminal to send the sidelink data; or
a resource used by the first terminal to receive the SFCI from the second terminal.

The operation that the first uplink resource is determined according to at least one of the following information may include the following operations.

The available value set of the at least one piece of information is determined according to the protocol or the configuration of the high-layer signaling sent by the network-side device.

An available value in the available value set configured by the high-layer signaling or predetermined in the protocol is determined according to the target resource, and the first uplink resource is determined according to the determined available value.

The target resource may include one of:
a resource used by the first terminal to receive the physical-layer downlink control signaling for scheduling the data transmission from the first terminal to the second terminal;
a resource used by the first terminal to send the SCI;
a resource used by the first terminal to send the sidelink data; or
a resource used by the first terminal to receive the SFCI from the second terminal.

When at least two pieces of SFCI are received and the uplink control information includes the received SFCI or the first information, one of the following applies.

The uplink control information may include the received at least two pieces of SFCI, ID information of a respective second terminal corresponding to each piece of SFCI, and a respective HARQ process ID corresponding to each piece of SFCI.

The uplink control information may include generated at least two pieces of first information, ID information of a respective second terminal corresponding to each piece of first information, and a respective HARQ process ID corresponding to each piece of first information.

The uplink control information may include the received at least two pieces of SFCI, positions of the SFCI corresponding to different HARQ processes of different second terminals in the uplink control information being different.

The uplink control information may include the generated at least two pieces of first information, positions of the first information corresponding to different HARQ processes of different second terminals in the uplink control information being different.

The positions of the SFCI corresponding to different HARQ processes of different second terminals in the uplink control information may be determined and reported by the first terminal to the network-side device through high-layer or physical-layer signaling, or determined and configured by the network-side device for the first terminal through high-layer or physical-layer signaling, or predetermined in the protocol.

And/or, the positions of the first information corresponding to different HARQ processes of different second terminals in the uplink control information may be determined and reported by the first terminal to the network-side device through the high-layer or physical-layer signaling, or determined and configured by the network-side device for the first terminal through the high-layer or physical-layer signaling, or predetermined in the protocol.

When the uplink control information is the SR, at least one of the following applies.

Different SR configuration information or different SR sequences may be used for indicating whether a sidelink resource requested by the first terminal is an initial transmission resource or a retransmission resource.

Different SR configuration information or different SR sequences may be used for indicating ID information of different second terminals that receive data on the requested sidelink resource and/or different HARQ process IDs.

The embodiments of the disclosure also provide a method for receiving control information, which is applied to a network-side device and includes the following operations.

Uplink control information sent by a first terminal on a first uplink resource is received. The uplink control information includes at least one of:
SFCI received by the first terminal from at least one second terminal;
first information generated by the first terminal according to the SFCI received from the at least one second terminal and indicating whether the second terminal correctly receives sidelink data sent by the first terminal;
a BSR carrying the SFCI received by the first terminal from the at least one second terminal; or
an SR.

The method may further include the following operation.
High-layer signaling is sent to the first terminal, the high-layer signaling being used for configuring an available value set of at least one piece of information.

The information may include at least one of:
slot information indicating the number of gap slots between a slot used for uplink transmission of the uplink control information and a target slot, the target slot being a slot used by the first terminal to receive physical-layer downlink control signaling for scheduling data transmission from the first terminal to the second terminal, or a slot used by the first terminal to send SCI, or a slot used by the first terminal to send the sidelink data, or a slot used by the first terminal to receive the SFCI from the second terminal;
symbol information indicating a symbol occupied by the uplink control information in the occupied slot;
resource block information indicating a PRB occupied by the uplink control information in the occupied slot;
format information indicating a PUCCH format available for the uplink control information; or
PUCCH resource information indicating an ID of a PUCCH resource occupied by the uplink control information.

The method may further include the following operation.
Physical-layer downlink control signaling is sent to the first terminal, the physical-layer downlink control signaling indicating an available value in the available value set configured by the high-layer signaling.

When at least two pieces of SFCI are received and the uplink control information includes the received SFCI or the first information, one of the following applies.

The uplink control information may include the at least two pieces of SFCI, ID information of a respective second terminal corresponding to each piece of SFCI, and a respective HARQ process ID corresponding to each piece of SFCI.

The uplink control information may include at least two pieces of first information, ID information of a respective second terminal corresponding to each piece of first information, and a respective HARQ process ID corresponding to each piece of first information.

The uplink control information may include the at least two pieces of SFCI, positions of the SFCI corresponding to different HARQ processes of different second terminals in the uplink control information being different.

The uplink control information may include the at least two pieces of first information, positions of the first information corresponding to different HARQ processes of different second terminals in the uplink control information being different.

The positions of the SFCI corresponding to different HARQ processes of different second terminals in the uplink control information may be determined and reported by the first terminal to the network-side device through high-layer or physical-layer signaling, or determined and configured by the network-side device for the first terminal through high-layer or physical-layer signaling, or predetermined in a protocol.

And/or, the positions of the first information corresponding to different HARQ processes of different second terminals in the uplink control information may be determined and reported by the first terminal to the network-side device through the high-layer or physical-layer signaling, or determined and configured by the network-side device for the first terminal through the high-layer or physical-layer signaling, or predetermined in the protocol.

When the uplink control information is the SR, at least one of the following applies.

Different SR configuration information or different SR sequences may be used for indicating whether a sidelink resource requested by the first terminal is an initial transmission resource or a retransmission resource.

Different SR configuration information or different SR sequences may be used for indicating ID information of different second terminals that receive data on the requested sidelink resource and/or different HARQ process IDs.

The embodiments of the disclosure also provide a terminal, which is a first terminal and includes a processor and a transceiver. The processor is configured to control the transceiver to receive SFCI from at least one second terminal; and send uplink control information on a first uplink resource according to the received SFCI.

The uplink control information may include at least one of:
the received SFCI;
first information generated according to the received SFCI and indicating whether the second terminal correctly receives sidelink data sent by the first terminal;
a BSR carrying the received SFCI; or
an SR.

The processor may further be configured to determine the first uplink resource according to at least one of the following information:
slot information indicating the number of gap slots between a slot used for the uplink control information and a target slot, the target slot being a slot used by the first terminal to receive physical-layer downlink control signaling for scheduling data transmission from the first terminal to the second terminal, or a slot used by the first terminal to send SCI, or a slot used by the first terminal to send the sidelink data, or a slot used by the first terminal to receive the SFCI from the second terminal;
symbol information indicating a symbol occupied by the uplink control information in the occupied slot;
resource block information indicating a PRB occupied by the uplink control information in the occupied slot;
format information indicating a PUCCH format available for the uplink control information; or
PUCCH resource information indicating an ID of a PUCCH resource occupied by the uplink control information.

The transceiver may further be configured to determine an available value set of at least one piece of information according to a protocol or a configuration of high-layer signaling sent by a network-side device; and receive the physical-layer downlink control signaling from the network-side device, the physical-layer downlink control signaling indicating an available value in the available value set configured by the high-layer signaling or predetermined in the protocol.

The processor may further be configured to determine the first uplink resource according to the available value indicated by the physical-layer downlink control signaling.

The processor may further be configured to determine an available value of the at least one piece of information according to a target resource, and determine the first uplink resource according to the determined available value.

The target resource may include one of:
a resource used by the first terminal to receive the physical-layer downlink control signaling for scheduling data transmission from the first terminal to the second terminal;
a resource used by the first terminal to send the SCI;
a resource used by the first terminal to send the sidelink data; or
a resource used by the first terminal to receive the SFCI from the second terminal.

The transceiver may further be configured to determine the available value set of the at least one piece of information according to the protocol or the configuration of the high-layer signaling sent by the network-side device.

The processor may further be configured to determine an available value in the available value set configured by the high-layer signaling or predetermined in the protocol according to the target resource, and determine the first uplink resource according to the determined available value.

The target resource may include one of:
a resource used by the first terminal to receive the physical-layer downlink control signaling for scheduling data transmission from the first terminal to the second terminal;
a resource used by the first terminal to send the SCI;
a resource used by the first terminal to send the sidelink data; or
a resource used by the first terminal to receive the SFCI from the second terminal.

When at least two pieces of SFCI are received and the uplink control information includes the received SFCI or the first information, one of the following applies.

The uplink control information may include the received at least two pieces of SFCI, ID information of a respective second terminal corresponding to each piece of SFCI, and a respective HARQ process ID corresponding to each piece of SFCI.

The uplink control information may include generated at least two pieces of first information, ID information of a respective second terminal corresponding to each piece of first information, and a respective HARQ process ID corresponding to each piece of first information.

The uplink control information may include the received at least two pieces of SFCI, positions of the SFCI corresponding to different HARQ processes of different second terminals in the uplink control information being different.

The uplink control information may include the generated at least two pieces of first information, positions of the first information corresponding to different HARQ processes of different second terminals in the uplink control information being different.

The positions of the SFCI corresponding to different HARQ processes of different second terminals in the uplink control information may be determined and reported by the first terminal to the network-side device through high-layer or physical-layer signaling, or determined and configured by the network-side device for the first terminal through high-layer or physical-layer signaling, or predetermined in the protocol.

And/or, the positions of the first information corresponding to different HARQ processes of different second terminals in the uplink control information may be determined and reported by the first terminal to the network-side device through the high-layer or physical-layer signaling, or determined and configured by the network-side device for the first terminal through the high-layer or physical-layer signaling, or predetermined in the protocol.

When the uplink control information is the SR, at least one of the following applies.

Different SR configuration information or different SR sequences may be used for indicating whether a sidelink resource requested by the first terminal is an initial transmission resource or a retransmission resource.

Different SR configuration information or different SR sequences may be used for indicating ID information of different second terminals that receive data on the requested sidelink resource and/or different HARQ process IDs.

The embodiments of the disclosure also provide an apparatus for receiving control information, which is applied to a first terminal and includes a first receiving module and a first sending module.

The first receiving module is configured to receive SFCI from at least one second terminal.

The first sending module is configured to send uplink control information on a first uplink resource according to the received SFCI.

The embodiments of the disclosure also provide a network-side device, which includes a processor and a transceiver. The processor is configured to control the transceiver to receive uplink control information sent by a first terminal on a first uplink resource. The uplink control information including at least one of:

SFCI received by the first terminal from at least one second terminal;
first information generated by the first terminal according to the SFCI received from the at least one second terminal and indicating whether the second terminal correctly receives sidelink data sent by the first terminal;
a BSR carrying the SFCI received by the first terminal from the at least one second terminal; or
an SR.

The transceiver may further be configured to send high-layer signaling to the first terminal, the high-layer signaling being used for configuring an available value set of at least one piece of information.

The information may include at least one of:
slot information indicating the number of gap slots between a slot used for uplink transmission of the uplink control information and a target slot, the target slot being a slot used by the first terminal to receive physical-layer downlink control signaling for scheduling data transmission from the first terminal to the second terminal, or a slot used by the first terminal to send SCI, or a slot used by the first terminal to send the sidelink data, or a slot used by the first terminal to receive the SFCI from the second terminal;
symbol information indicating a symbol occupied by the uplink control information in the occupied slot;
resource block information indicating a PRB occupied by the uplink control information in the occupied slot;
format information indicating a PUCCH format available for the uplink control information; or
PUCCH resource information indicating an ID of a PUCCH resource occupied by the uplink control information.

The transceiver may further be configured to send physical-layer downlink control signaling to the first terminal, the physical-layer downlink control signaling indicating an available value in the available value set configured by the high-layer signaling.

When at least two pieces of SFCI are received and the uplink control information includes the received SFCI or the first information, one of the following applies.

The uplink control information may include the at least two pieces of SFCI, ID information of a respective second terminal corresponding to each piece of SFCI, and a respective HARQ process ID corresponding to each piece of SFCI.

The uplink control information may include at least two pieces of first information, ID information of a respective second terminal corresponding to each piece of first information, and a respective HARQ process ID corresponding to each piece of first information.

The uplink control information may include the at least two pieces of SFCI, positions of the SFCI corresponding to different HARQ processes of different second terminals in the uplink control information being different.

The uplink control information may include the at least two pieces of first information, positions of the first information corresponding to different HARQ processes of different second terminals in the uplink control information being different.

The positions of the SFCI corresponding to different HARQ processes of different second terminals in the uplink control information may be determined and reported by the first terminal to the network-side device through high-layer or physical-layer signaling, or determined and configured by the network-side device for the first terminal through high-layer or physical-layer signaling, or predetermined in a protocol.

And/or, the positions of the first information corresponding to different HARQ processes of different second terminals in the uplink control information may be determined and reported by the first terminal to the network-side device through the high-layer or physical-layer signaling, or determined and configured by the network-side device for the first terminal through the high-layer or physical-layer signaling, or predetermined in the protocol.

When the uplink control information is the SR, at least one of the following applies.

Different SR configuration information or different SR sequences may be used for indicating whether a sidelink resource requested by the first terminal is an initial transmission resource or a retransmission resource.

Different SR configuration information or different SR sequences may be used for indicating ID information of different second terminals that receive data on the requested sidelink resource and/or different HARQ process IDs.

The embodiments of the disclosure also provide an apparatus for receiving control information, which is applied to a network-side device and includes a second receiving module.

The second receiving module is configured to receive uplink control information sent by a first terminal on a first uplink resource. The uplink control information including at least one of:

SFCI received by the first terminal from at least one second terminal;
first information generated by the first terminal according to the SFCI received from the at least one second terminal and indicating whether the second terminal correctly receives sidelink data sent by the first terminal;

a BSR carrying the SFCI received by the first terminal from the at least one second terminal; or an SR.

The embodiments of the disclosure also provide a computer-readable storage medium having stored thereon a computer program which, when being executed by a processor, causes the processor to implement the steps in the method for sending control information, or causes the processor to implement the steps in the method for receiving control information.

The technical solutions of the disclosure at least have the following beneficial effects.

In the method for sending control information, the method for receiving control information, terminal, and network-side device in the embodiments of the disclosure, the second terminal (i.e., a receiving terminal on a sidelink) sends the SFCI generated by it to the first terminal (i.e., a sending terminal on the sidelink), and the first terminal sends the uplink control information on the first uplink resource according to the received SFCI, so that the network-side device may perform resource scheduling more reasonably according to the received uplink control information.

DETAILED DESCRIPTION

To make the technical problem to be solved, technical solutions, and advantages of the disclosure clearer, detailed descriptions will be made below in combination with the drawings and specific embodiments.

Figure 1:
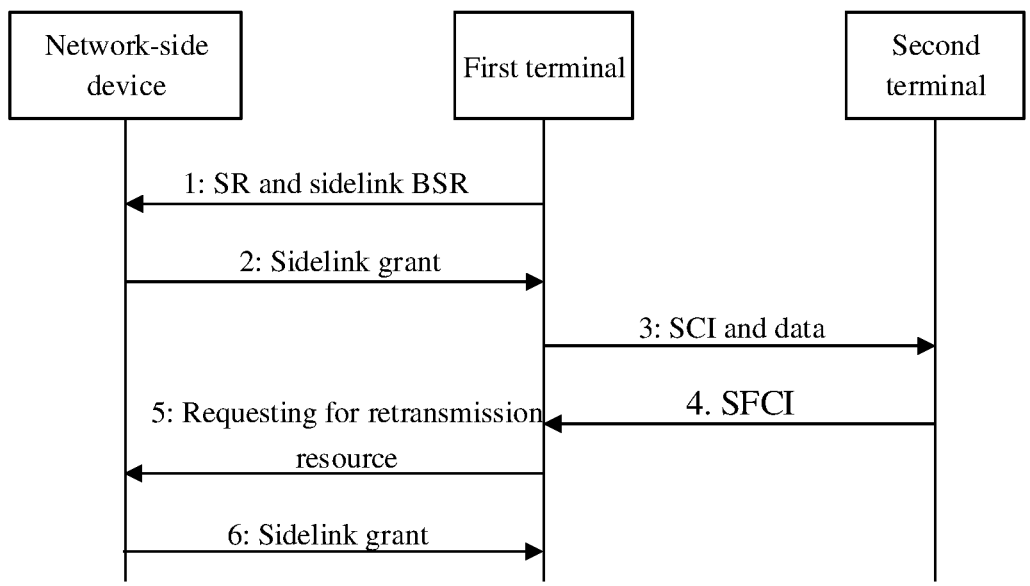
FIG. 1 shows HARQ feedback steps in mode 1.

According to a protocol in the related art, HARQ feedback in mode 1 specifically includes that a second terminal feeds back SFCI to a first terminal through a sidelink. As shown in FIG. 1, specific operations are as follows.

In operation 1, the first terminal sends an SR and a sidelink BSR to a network-side device.

In operation 2, the network-side device sends a sidelink grant to the first terminal for resource allocation.

In operation 3, the first terminal sends SCI and data on a corresponding resource according to the sidelink grant received from the network-side device.

In operation 4, the second terminal performs blind detection on the SCI, receives the data, and sends the SFCI (including an ACK, or a NACK, or DTX) to the first terminal.

In operation 5, the first terminal requests the network-side device for a retransmission resource.

In operation 6, the network-side device transmits the sidelink grant to the first terminal to schedule retransmission.

The following situations exist in the abovementioned HARQ feedback manner.

For example, an initial transmission resource is allocated by the network-side device to the first terminal in a Semi-Persistent Scheduling (SPS) manner. During retransmission, however, a resource of only one slot is required to be requested (like the operation 5 mentioned above). However, the network-side device cannot distinguish initial transmission from retransmission when a resource is requested through an SR according to an existed mechanism, and BSR is a Media Access Control (MAC)-layer mechanism that is relatively long in latency. Therefore, a mechanism that the first terminal requests the network-side device for the retransmission resource in the abovementioned HARQ feedback manner needs to be enhanced.

Figure 2:
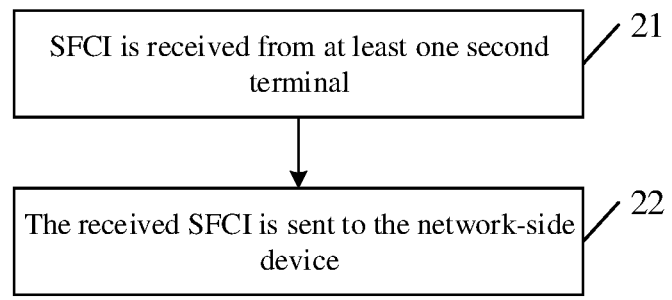
FIG. 2 is a flowchart of a method for sending control information according to an embodiment of the disclosure.

As shown in FIG. 2, an embodiment of the disclosure provides a method for sending control information, which is applied to a first terminal and includes the following operations.

In operation 21, SFCI is received from at least one second terminal.

In operation 22, uplink control information is sent on a first uplink resource according to the received SFCI.

It is to be noted that, in the embodiment of the disclosure, the first terminal is a sending terminal on a sidelink, and the second terminal is a receiving terminal on the sidelink.

In the embodiment of the disclosure, the first terminal sends the uplink control information on the first uplink resource according to the received SFCI to request a network-side device for a resource. The SFCI is not a HARQ-ACK feedback of the first terminal based on downlink data but SFCI received by the first terminal from the second terminal.

Optionally, if the received SFCI is an ACK, when the first terminal sends the uplink control information to the network-side device, the uplink control information is used to notify the network-side device that a HARQ process number corresponding to the uplink control information may be released. When the received SFCI is a NACK, the first terminal sends the uplink control information to the network-side device to request the network-side device for a sidelink resource.

Optionally, the uplink control information includes at least one of:

the SFCI received by the first terminal;

first information generated by the first terminal according to the received SFCI and used for indicating whether the second terminal correctly receives sidelink data sent by the first terminal;

a BSR carrying the SFCI received by the first terminal, namely the SFCI is added to the BSR; or an SR.

It is to be noted that a respective piece of first information may be generated for each piece of SFCI, and a content in the first information is the same as a content in the corresponding SFCI. For example, when the SFCI is a NACK, the first information is also a NACK. However, a format of the first information may be the same as or different from a format of the SFCI. When the format of the first information is also the same as the format of the SFCI, the first information and the SFCI are the same information with different names.

Optionally, the first uplink resource may be a PUCCH resource, or may be a Physical Uplink Shared Channel (PUSCH) resource.

Optionally, in the embodiment of the disclosure, the method further includes the following operation.

The first uplink resource is determined according to at least one of the following information:

slot information indicating the number of gap slots between a slot used for the uplink control information and a target slot, the target slot being a slot used by the first terminal to receive physical-layer downlink control signaling for scheduling data transmission from the first terminal to the second terminal, or a slot used by the first terminal to send SCI, or a slot used by the first terminal to send the sidelink data, or a slot used by the first terminal to receive the SFCI from the second terminal;

symbol information indicating a symbol occupied by the uplink control information in the occupied slot and including a starting symbol as well as a symbol length or an ending symbol as well as a symbol length;

resource block information indicating a PRB occupied by the uplink control information in the occupied slot and including a starting PRB as well as the number of PRBs or an ending PRB as well as the number of PRBs;

format information indicating a PUCCH format available for the uplink control information; or PUCCH resource information indicating an ID of a PUCCH resource occupied by the uplink control information, for example, a PUCCH resource ID.

Which one or several pieces of the abovementioned information are used to determine the first uplink resource may be specified in a protocol.

As an optional embodiment (explicit indication), the operation that the first uplink resource is determined according to at least one of the following information includes the following operations.

An available value set of the at least one piece of information is determined according to a protocol or a configuration of high-layer signaling sent by a network-side device.

Physical-layer downlink control signaling sent by the network-side device is received, the physical-layer downlink control signaling indicating an available value in the available value set configured by the high-layer signaling or predetermined in the protocol.

The first uplink resource is determined according to the available value indicated by the physical-layer downlink control signaling.

As another optional embodiment (implicit indication), the operation that the first uplink resource is determined according to at least one of the following information includes the following operation.

An available value of the at least one piece of information is determined according to a target resource, and the first uplink resource is determined according to the determined available value.

The target resource includes one of the following resources:

a resource used by the first terminal to receive the physical-layer downlink control signaling for scheduling data transmission from the first terminal to the second terminal;

a resource used by the first terminal to send the SCI;

a resource used by the first terminal to send the sidelink data; or a resource used by the first terminal to receive the SFCI from the second terminal.

It is to be noted that there is a certain mapping relationship between the target resource and the available value of the at least one piece of information, and the first terminal may determine the available value of the at least one piece of information according to the target resource.

As another optional embodiment (explicit indication+implicit indication), the operation that the first uplink resource is determined according to at least one of the following information includes the following operations.

The available value set of the at least one piece of information is determined according to the protocol or the configuration of the high-layer signaling sent by the network-side device.

An available value in the available value set configured by the high-layer signaling or predetermined in the protocol is determined according to the target resource, and the first uplink resource is determined according to the determined available value.

The target resource includes one of the following resources:

the resource used by the first terminal to receive the physical-layer downlink control signaling for scheduling data transmission from the first terminal to the second terminal;

the resource used by the first terminal to send the SCI;

the resource used by the first terminal to send the sidelink data; or the resource used by the first terminal to receive the SFCI from the second terminal.

For example, the network-side device configures an available value set of slot information m for transmission of the uplink control information fed back by the first terminal in the uplink resource to be $m \in \{1,2,3,4,5,6,7,8\}$ through the high-layer signaling. In such case, the first terminal sends the uplink control information to the network-side device in slot n+m if the first terminal receives the physical-layer downlink control signaling for scheduling data transmission from the first terminal to the second terminal in slot n, or the first terminal sends the SCI in slot n, or the first terminal sends the sidelink data in slot n, or the first terminal receives the SFCI from the second terminal in slot n.

The network-side device configures, through the high-layer signaling, the PUCCH resource information for feedback of the uplink control information by the first terminal, the PUCCH resource information indicating the PUCCH resource ID that may be occupied by the uplink control information. For example, PUCCH resource information $\{0,1,2,3,4,5,6,7\}$ represents 1st, 2nd, 3rd, 4th, 5th, 6th, 7th and 8th PUCCH resource in a PUCCH resource list configured by a high layer.

The network-side device sends the physical-layer downlink control signaling to the first terminal, in which 3 bits (for example, 001) indicates that slot information m is 1, and other 3 bits (for example, 000) indicates that the PUCCH resource ID is PUCCH resource 0.

If the first terminal receives the SFCI from the second terminal in slot n, the first terminal sends the uplink control information on PUCCH resource 0 in slot n+1 according to the physical-layer downlink control signaling received from the network-side device.

Furthermore, in the embodiment of the disclosure, since the first terminal may send sidelink data to multiple second terminals and send multiple pieces of sidelink data to each second terminal, there may exist such a condition that SFCI corresponding to multiple HARQ processes of a second terminal and SFCI corresponding to multiple HARQ processes of multiple second terminals are fed back on the same first uplink resource, and the SFCI or first information corresponding to the SFCI respectively is required to be multiplexed to be transmitted in the same first uplink resource. That is, under the condition that at least two pieces of SFCI are received, and the uplink control information is the received SFCI or the first information, in order to enable the network-side device to distinguish a specific HARQ process of a specific second terminal corresponding to each piece of SFCI (the network-side device is required to distinguish the specific HARQ process of the specific second terminal corresponding to each piece of SFCI to implement more accurate scheduling), the following conditions exist.

As an embodiment, the uplink control information includes the received at least two pieces of SFCI, ID information of a respective second terminal corresponding to each piece of SFCI, and a respective HARQ process ID corresponding to each piece of SFCI.

Alternatively, the uplink control information includes generated at least two pieces of first information, ID information of a respective second terminal corresponding to each piece of first information, and a respective HARQ process ID corresponding to each piece of first information.

This is a direct indication method. The ID information of the respective second terminal corresponding to each piece of SFCI or first information and the respective HARQ process ID corresponding to each piece of SFCI or first information are directly carried on the first uplink resource, and the network-side device may determine the specific HARQ process of the specific second terminal corresponding to a piece of SFCI.

As another embodiment, the uplink control information includes the received at least two pieces of SFCI, positions of the SFCI corresponding to different HARQ processes of different second terminals in the uplink control information being different.

Alternatively, the uplink control information includes the generated at least two pieces of first information, positions of the first information corresponding to different HARQ processes of different second terminals in the uplink control information being different.

This is an indirect indication method. The at least two pieces of SFCI or the at least two pieces of first information may be called a set, the positions of the SFCI or first information corresponding to different HARQ processes of different second terminals in the corresponding set are different, and the network-side device determines the specific HARQ process of the specific second terminal corresponding to a piece of SFCI according to the position of the SFCI or the first information in the set.

For example, the positions of the at least two pieces of SFCI or first information in the uplink control information are arranged according to two-layer cycling, the ID information of the second terminals being cycled in an outer layer from large to small, and the HARQ process IDs being cycled in an inner layer from small to large.

Optionally, the positions of the SFCI corresponding to different HARQ processes of different second terminals in the uplink control information are determined and reported by the first terminal to the network-side device through high-layer or physical-layer signaling, or determined and configured by the network-side device for the first terminal through high-layer or physical-layer signaling, or predetermined in the protocol.

Optionally, the positions of the first information corresponding to different HARQ processes of different second terminals in the uplink control information are determined and reported by the first terminal to the network-side device through the high-layer or physical-layer signaling, or determined and configured by the network-side device for the first terminal through the high-layer or physical-layer signaling, or predetermined in the protocol.

If a bit overhead needs to be reduced, a method of packing the SFCI corresponding to different HARQ processes of the same second terminal may be considered. Descriptions thereof are omitted herein.

For example, the network-side device notifies the first terminal by configuring through the high-layer signaling and/or indicating through the physical-layer downlink control signaling that the first terminal is required to feed back the uplink control information to the network-side device in slot n through the first uplink resource.

The network-side device notifies the first terminal by configuring through the high-layer signaling, and/or indicating through the physical-layer downlink control signaling, or predetermining in the protocol that the SFCI fed back by the first terminal in slot n through the first uplink resource is required to include SFCI corresponding to HARQ process 0 to HARQ process 7 of second terminal #1, SFCI corresponding to HARQ process 0 to HARQ process 7 of second terminal #2, and SFCI corresponding to HARQ process 0 to HARQ process 7 of second terminal #3.

The first terminal arranges the respective SFCI corresponding to each HARQ process of each second terminal in the uplink control information that the first terminal is required to feed back to a base station according to a sequencing manner of HARQ process 0 to HARQ process 7 of second terminal #1, HARQ process 0 to HARQ process 7 of second terminal #2, and HARQ process 0 to HARQ process 7 of second terminal #3, and feeds back the uplink control information to the network-side device on a specified uplink resource of slot n.

Optionally, in the embodiment of the disclosure, in order to save resources, the first terminal is not required to allocate an additional uplink resource for the uplink control information, and instead, the first terminal requests the network-side device for a resource through the SR or the BSR. Specifically, when the uplink control information is the SR, at least one of the following applies.

Different SR configuration information or different SR sequences are used for indicating whether a sidelink resource requested by the first terminal is an initial transmission resource or a retransmission resource.

Different SR configuration information or different SR sequences are used for indicating ID information of different second terminals that receive data on the requested sidelink resource and/or different HARQ process IDs.

For example, the network-side device configures 36 types of SR configuration information (0 to 35) for the first terminal through the high-layer signaling. SR configuration information 0 to 7 corresponds to retransmission of HARQ processes 0 to 7 of second terminal #1, SR configuration information 8 to 15 corresponds to retransmission of HARQ processes 0 to 7 of second terminal #2, SR configuration information 16 to 23 corresponds to retransmission of HARQ processes 0 to 7 of second terminal #3, SR configuration information 24 to 31 corresponds to retransmission of HARQ processes 0 to 7 of second terminal #4, and SR configuration information 32 to 35 corresponds to initial transmission of second terminal #1 to second terminal #4.

In summary, in the method for sending control information provided in the embodiment of the disclosure, the first terminal sends the uplink control information to the network-side device on the first uplink resource according to the received SFCI, such that the network-side device may distinguish whether the resource requested by the first terminal is for initial transmission or retransmission and further for initial transmission or retransmission of which HARQ process of which second terminal, so as to further implement resource scheduling more reasonably.

Figure 3:
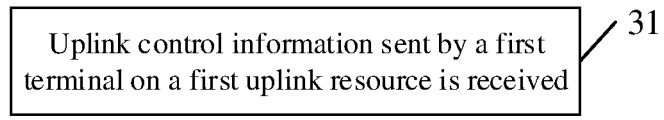
FIG. 3 is a flowchart of a method for receiving control information according to an embodiment of the disclosure.

As shown in FIG. 3, an embodiment of the disclosure also provides a method for receiving control information, which is applied to a network-side device and includes the following operations.

In operation 31, uplink control information sent by a first terminal on a first uplink resource is received, the uplink control information including at least one of:

SFCI received by the first terminal from at least one second terminal;

first information generated by the first terminal according to the SFCI received from the at least one second terminal and used for indicating whether the second terminal correctly receives sidelink data sent by the first terminal;

a BSR carrying the SFCI received by the first terminal from the at least one second terminal; or an SR.

It is to be noted that, in the embodiment of the disclosure, the first terminal is a sending terminal on a sidelink, and the second terminal is a receiving terminal on the sidelink.

In the embodiment of the disclosure, the first terminal sends the uplink control information on the first uplink resource according to the received SFCI to request a network-side device for a resource. The SFCI is not a HARQ-ACK feedback of the first terminal based on downlink data but SFCI received by the first terminal from the second terminal.

Optionally, if the received SFCI is an ACK, when the first terminal sends the uplink control information to the network-side device, the uplink control information is used to notify the network-side device that a HARQ process number corresponding to the uplink control information may be released. When the received SFCI is a NACK, the first terminal sends the uplink control information to the network-side device to request the network-side device for a sidelink resource.

It is to be noted that a respective piece of first information may be generated for each piece of SFCI, and a content in the first information is the same as a content in the corresponding SFCI. For example, when the SFCI is a NACK, the first information is also a NACK. However, a format of the first information may be the same as or different from a format of the SFCI. When the format of the first information is also the same as the format of the SFCI, the first information and the SFCI are the same information with different names.

Optionally, the first uplink resource may be a PUCCH resource, or may be a PUSCH resource.

Optionally, in the embodiment of the disclosure, the method further includes the following operation.

High-layer signaling is sent to the first terminal, the high-layer signaling being used for configuring an available value set of at least one piece of information.

The information includes at least one of:

slot information indicating the number of gap slots between a slot used for uplink transmission of the uplink control information and a target slot, the target slot being a slot used by the first terminal to receive physical-layer downlink control signaling for scheduling data transmission from the first terminal to the second terminal, or a slot used by the first terminal to send SCI, or a slot used by the first terminal to send the sidelink data, or a slot used by the first terminal to receive the SFCI from the second terminal;

symbol information indicating a symbol occupied by the uplink control information in the occupied slot;

resource block information indicating a PRB occupied by the uplink control information in the occupied slot;

format information indicating a PUCCH format available for the uplink control information; or PUCCH resource information indicating an ID of a PUCCH resource occupied by the uplink control information.

For example, the network-side device configures an available value set of slot information m for transmission of the uplink control information fed back by the first terminal in the uplink resource to be $m \in \{1,2,3,4,5,6,7,8\}$ through the high-layer signaling. For another example, the network-side device configures, through the high-layer signaling, the PUCCH resource information for feedback of the uplink control information by the first terminal, the PUCCH resource information indicating the PUCCH resource ID that may be occupied by the uplink control information. For example, PUCCH resource information $\{0,1,2,3,4,5,6,7\}$ represents 1st, 2nd, 3rd, 4th, 5th, 6th, 7th and 8th PUCCH resource in a PUCCH resource list configured by a high layer.

Furthermore, the method further includes the following operation.

Physical-layer downlink control signaling is sent to the first terminal, the physical-layer downlink control signaling indicating an available value in the available value set configured by the high-layer signaling.

For example, the network-side device sends the physical-layer downlink control signaling to the first terminal, in which 3 bits (for example, 001) indicates that slot information m is 1, and other 3 bits (for example, 000) indicates that the PUCCH resource ID is PUCCH resource 0.

Furthermore, in the embodiment of the disclosure, since the first terminal may send sidelink data to multiple second terminals and send multiple pieces of sidelink data to each second terminal, there may exist such a condition that SFCI corresponding to multiple HARQ processes of a second terminal and SFCI corresponding to multiple HARQ processes of multiple second terminals are fed back on the same first uplink resource, and the SFCI or first information corresponding to the SFCI respectively is required to be multiplexed to be transmitted in the same first uplink resource. That is, under the condition that at least two pieces of SFCI are received, and the uplink control information is the received SFCI or the first information, in order to enable the network-side device to distinguish a specific HARQ process of a specific second terminal corresponding to each piece of SFCI (the network-side device is required to distinguish the specific HARQ process of the specific second terminal corresponding to each piece of SFCI to implement more accurate scheduling), the following conditions exist.

As an embodiment, when at least two pieces of SFCI are received and the uplink control information includes the received SFCI or the first information, one of the following applies.

The uplink control information includes the at least two pieces of SFCI, ID information of a respective second terminal corresponding to each piece of SFCI, and a respective HARQ process ID corresponding to each piece of SFCI.

The uplink control information includes at least two pieces of first information, ID information of a respective second terminal corresponding to each piece of first information, and a respective HARQ process ID corresponding to each piece of first information.

This is a direct indication method. The ID information of the respective second terminal corresponding to each piece of SFCI or first information and the respective HARQ process ID corresponding to each piece of SFCI or first information are directly carried on the first uplink resource, and the network-side device may determine the specific HARQ process of the specific second terminal corresponding to a piece of SFCI.

As another embodiment, the uplink control information includes the at least two pieces of SFCI, positions of the SFCI corresponding to different HARQ processes of different second terminals in the uplink control information being different.

Alternatively, the uplink control information includes the at least two pieces of first information, positions of the first information corresponding to different HARQ processes of different second terminals in the uplink control information being different.

This is an indirect indication method. The at least two pieces of SFCI or the at least two pieces of first information may be called a set, the positions of the SFCI or first information corresponding to different HARQ processes of different second terminals in the corresponding set are different, and the network-side device determines the specific HARQ process of the specific second terminal corresponding to a piece of SFCI according to the position of the SFCI or the first information in the set.

For example, the positions of the at least two pieces of SFCI or first information in the uplink control information are arranged according to two-layer cycling, the ID information of the second terminals being cycled in an outer layer from large to small, and the HARQ process IDs being cycled in an inner layer from small to large.

Optionally, the positions of the SFCI corresponding to different HARQ processes of different second terminals in the uplink control information are determined and reported by the first terminal to the network-side device through high-layer or physical-layer signaling, or determined and configured by the network-side device for the first terminal through high-layer or physical-layer signaling, or predetermined in the protocol.

Optionally, the positions of the first information corresponding to different HARQ processes of different second terminals in the uplink control information are determined and reported by the first terminal to the network-side device through the high-layer or physical-layer signaling, or determined and configured by the network-side device for the first terminal through the high-layer or physical-layer signaling, or predetermined in the protocol.

For example, the network-side device notifies the first terminal by configuring through the high-layer signaling and/or indicating through the physical-layer downlink control signaling that the first terminal is required to feed back the uplink control information to the network-side device in slot n through the first uplink resource.

The network-side device notifies the first terminal by configuring through the high-layer signaling, and/or indicating through the physical-layer downlink control signaling, or predetermining in the protocol that the SFCI fed back by the first terminal in slot n through the first uplink resource is required to include SFCI corresponding to HARQ process 0 to HARQ process 7 of second terminal #1, SFCI corresponding to HARQ process 0 to HARQ process 7 of second terminal #2, and SFCI corresponding to HARQ process 0 to HARQ process 7 of second terminal #3.

Optionally, in the embodiment of the disclosure, in order to save resources, the first terminal is not required to allocate an additional uplink resource for the uplink control information, and instead, the first terminal requests the network-side device for a resource through the SR or the BSR. Specifically, when the uplink control information is the SR, at least one of the following applies.

Different SR configuration information or different SR sequences are used for indicating whether a sidelink resource requested by the first terminal is an initial transmission resource or a retransmission resource.

Different SR configuration information or different SR sequences are used for indicating ID information of different second terminals that receive data on the requested sidelink resource and/or different HARQ process IDs.

For example, the network-side device configures 36 types of SR configuration information (0 to 35) for the first terminal through the high-layer signaling. SR configuration information 0 to 7 corresponds to retransmission of HARQ processes 0 to 7 of second terminal #1, SR configuration information 8 to 15 corresponds to retransmission of HARQ processes 0 to 7 of second terminal #2, SR configuration information 16 to 23 corresponds to retransmission of HARQ processes 0 to 7 of second terminal #3, SR configuration information 24 to 31 corresponds to retransmission of HARQ processes 0 to 7 of second terminal #4, and SR configuration information 32 to 35 corresponds to initial transmission of second terminal #1 to second terminal #4.

In summary, in the method for receiving control information provided in the embodiment of the disclosure, the network-side device receives the uplink control information on the first uplink resource, and the network-side device may distinguish whether the resource requested by the first terminal is for initial transmission or retransmission and further for the initial transmission or retransmission of which HARQ process of which second terminal according to the received uplink control information, so as to further implement resource scheduling more reasonably.

Figure 4:
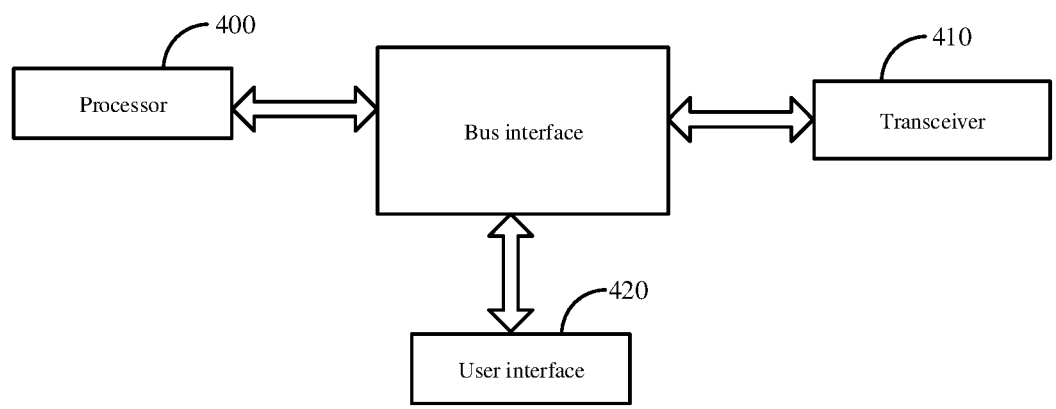
FIG. 4 is a structure diagram of a terminal according to an embodiment of the disclosure.

As shown in FIG. 4, an embodiment of the disclosure also provides a terminal, which is a first terminal and includes a processor 400 and a transceiver 410. The terminal further includes a user interface 420. The processor 400 is configured to control the transceiver 410 to receive SFCI from at least one second terminal, and send uplink control information on a first uplink resource according to the received SFCI.

Optionally, in the embodiment of the disclosure, the uplink control information includes at least one of:
the received SFCI;
first information generated according to the received SFCI and used for indicating whether the second terminal correctly receives sidelink data sent by the first terminal;
a BSR carrying the received SFCI; or
an SR.

Optionally, in the embodiment of the disclosure, the processor 400 is further configured to determine the first uplink resource according to at least one of:
slot information indicating the number of gap slots between a slot used for the uplink control information and a target slot, the target slot being a slot used by the first terminal to receive physical-layer downlink control signaling for scheduling data transmission from the first terminal to the second terminal, or a slot used by the first terminal to send SCI, or a slot used by the first terminal to send the sidelink data, or a slot used by the first terminal to receive the SFCI from the second terminal;

symbol information indicating a symbol occupied by the uplink control information in the occupied slot;

resource block information indicating a PRB occupied by the uplink control information in the occupied slot;

format information indicating a PUCCH format available for the uplink control information; or PUCCH resource information indicating an ID of a PUCCH resource occupied by the uplink control information.

Optionally, in the embodiment of the disclosure, the transceiver 410 is further configured to: determine an available value set of the at least one piece of information according to a protocol or a configuration of high-layer signaling sent by a network-side device; and receive physical-layer downlink control signaling from the network-side device, the physical-layer downlink control signaling indicating an available value in the available value set configured by the high-layer signaling or predetermined in the protocol.

The processor is further configured to determine the first uplink resource according to the available value indicated by the physical-layer downlink control signaling.

Optionally, in the embodiment of the disclosure, the processor 400 is further configured to: determine an available value of the at least one piece of information according to a target resource, and determine the first uplink resource according to the determined available value.

The target resource includes one of the following resources:

a resource used by the first terminal to receive the physical-layer downlink control signaling for scheduling data transmission from the first terminal to the second terminal;

a resource used by the first terminal to send the SCI;

a resource used by the first terminal to send the sidelink data; or a resource used by the first terminal to receive the SFCI from the second terminal.

Optionally, in the embodiment of the disclosure, the transceiver 410 is further configured to determine the available value set of the at least one piece of information according to the protocol or the configuration of the high-layer signaling sent by the network-side device.

The processor is further configured to determine an available value in the available value set configured by the high-layer signaling or predetermined in the protocol according to the target resource, and determine the first uplink resource according to the determined available value.

The target resource includes one of the following resources:

the resource used by the first terminal to receive the physical-layer downlink control signaling for scheduling data transmission from the first terminal to the second terminal;

the resource used by the first terminal to send the SCI;

the resource used by the first terminal to send the sidelink data; or the resource used by the first terminal to receive the SFCI from the second terminal.

Optionally, in the embodiment of the disclosure, when at least two pieces of SFCI are received and the uplink control information includes the received SFCI or the first information, one of the following applies.

The uplink control information includes the received at least two pieces of SFCI, ID information of a respective second terminal corresponding to each piece of SFCI, and a respective HARQ process ID corresponding to each piece of SFCI.

The uplink control information includes generated at least two pieces of first information, ID information of a respective second terminal corresponding to each piece of first information, and a respective HARQ process ID corresponding to each piece of first information.

The uplink control information includes the received at least two pieces of SFCI, positions of the SFCI corresponding to different HARQ processes of different second terminals in the uplink control information being different.

The uplink control information includes the generated at least two pieces of first information, positions of the first information corresponding to different HARQ processes of different second terminals in the uplink control information being different.

Optionally, in the embodiment of the disclosure, at least one of the following applies. The positions of the SFCI corresponding to different HARQ processes of different second terminals in the uplink control information are determined and reported by the first terminal to the network-side device through high-layer or physical-layer signaling, or determined and configured by the network-side device for the first terminal through high-layer or physical-layer signaling, or predetermined in the protocol.

The positions of the first information corresponding to different HARQ processes of different second terminals in the uplink control information are determined and reported by the first terminal to the network-side device through the high-layer or physical-layer signaling, or determined and configured by the network-side device for the first terminal through the high-layer or physical-layer signaling, or predetermined in the protocol.

Optionally, in the embodiment of the disclosure, when the uplink control information is the SR, at least one of the following applies.

Different SR configuration information or different SR sequences are used for indicating whether a sidelink resource requested by the first terminal is an initial transmission resource or a retransmission resource.

Different SR configuration information or different SR sequences are used for indicating ID information of different second terminals that receive data on the requested sidelink resource and/or different HARQ process IDs.

In summary, in the terminal provided in the embodiment of the disclosure, the first terminal sends the uplink control information to the network-side device on the first uplink resource according to the received SFCI, such that the network-side device may distinguish whether the resource requested by the first terminal is for initial transmission or retransmission, and further for initial transmission or retransmission of which HARQ process of which second terminal, so as to further implement resource scheduling more reasonably.

It is to be noted that the terminal provided in the embodiment of the disclosure is a terminal capable of executing the method for sending control information, all embodiments of the method for sending control information are applicable to the terminal, and the same or similar beneficial effects may be achieved.

Figure 5:
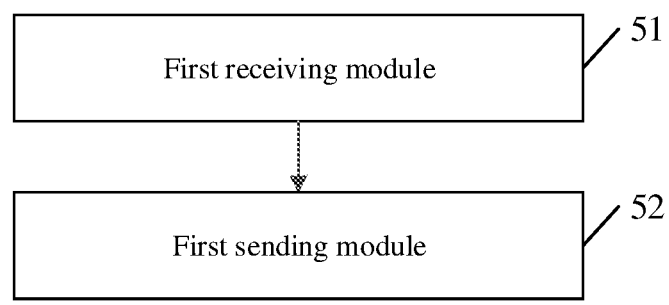
FIG. 5 is a structure diagram of an apparatus for sending control information according to an embodiment of the disclosure.

As shown in FIG. 5, an embodiment of the disclosure also provides an apparatus for sending control information, which is applied to a first terminal and includes a first receiving module 51 and a first sending module 52.

The first receiving module 51 is configured to receive SFCI from at least one second terminal.

The first sending module 52 is configured to send uplink control information on a first uplink resource according to the received SFCI.

Optionally, in the embodiment of the disclosure, the uplink control information includes at least one of:
the received SFCI;
first information generated according to the received SFCI and used for indicating whether the second terminal correctly receives sidelink data sent by the first terminal;
a BSR carrying the received SFCI; or
an SR.

Optionally, in the embodiment of the disclosure, the apparatus further includes a resource determination module.

The resource determination module is configured to determine the first uplink resource according to at least one of:
slot information indicating the number of gap slots between a slot used for the uplink control information and a target slot, the target slot being a slot used by the first terminal to receive physical-layer downlink control signaling for scheduling data transmission from the first terminal to the second terminal, or a slot used by the first terminal to send SCI, or a slot used by the first terminal to send the sidelink data, or a slot used by the first terminal to receive the SFCI from the second terminal;
symbol information indicating a symbol occupied by the uplink control information in the occupied slot;
resource block information indicating a PRB occupied by the uplink control information in the occupied slot;
format information indicating a PUCCH format available for the uplink control information; or
PUCCH resource information indicating an ID of a PUCCH resource occupied by the uplink control information.

Optionally, in the embodiment of the disclosure, the resource determination module includes a first submodule, a second submodule, and a third submodule.

The first submodule is configured to determine an available value set of the at least one piece of information according to a protocol or a configuration of high-layer signaling sent by a network-side device.

The second submodule is configured to receive physical-layer downlink control signaling from the network-side device, the physical-layer downlink control signaling indicating an available value in the available value set configured by the high-layer signaling or predetermined in the protocol.

The third submodule is configured to determine the first uplink resource according to the available value indicated by the physical-layer downlink control signaling.

Optionally, in the embodiment of the disclosure, the resource determination module includes a fourth submodule.

The fourth submodule is configured to determine an available value of the at least one piece of information according to a target resource, and determine the first uplink resource according to the determined available value.

The target resource includes one of the following resources:
a resource used by the first terminal to receive the physical-layer downlink control signaling for scheduling data transmission from the first terminal to the second terminal;
a resource used by the first terminal to send the SCI;
a resource used by the first terminal to send the sidelink data; or
a resource used by the first terminal to receive the SFCI from the second terminal.

Optionally, in the embodiment of the disclosure, the resource determination module includes a fifth submodule and a sixth submodule.

The fifth submodule is configured to determine the available value set of the at least one piece of information according to the protocol or the configuration of the high-layer signaling sent by the network-side device.

The sixth submodule is configured to determine an available value in the available value set configured by the high-layer signaling or predetermined in the protocol according to the target resource, and determine the first uplink resource according to the determined available value.

The target resource includes one of the following resources:
the resource used by the first terminal to receive the physical-layer downlink control signaling for scheduling data transmission from the first terminal to the second terminal;
the resource used by the first terminal to send the SCI;
the resource used by the first terminal to send the sidelink data; or
the resource used by the first terminal to receive the SFCI from the second terminal.

Optionally, in the embodiment of the disclosure, when at least two pieces of SFCI are received and the uplink control information includes the received SFCI or the first information, one of the following applies.

The uplink control information includes the received at least two pieces of SFCI, ID information of a respective second terminal corresponding to each piece of SFCI, and a respective HARQ process ID corresponding to each piece of SFCI.

The uplink control information includes generated at least two pieces of first information, ID information of a respective second terminal corresponding to each piece of first information, and a respective HARQ process ID corresponding to each piece of first information.

The uplink control information includes the received at least two pieces of SFCI, positions of the SFCI corresponding to different HARQ processes of different second terminals in the uplink control information being different.

The uplink control information includes the generated at least two pieces of first information, positions of the first information corresponding to different HARQ processes of different second terminals in the uplink control information being different.

Optionally, in the embodiment of the disclosure, at least one of the following applies. The positions of the SFCI corresponding to different HARQ processes of different second terminals in the uplink control information are determined and reported by the first terminal to the network-side device through high-layer or physical-layer signaling, or determined and configured by the network-side device for the first terminal through high-layer or physical-layer signaling, or predetermined in the protocol.

The positions of the first information corresponding to different HARQ processes of different second terminals in the uplink control information are determined and reported by the first terminal to the network-side device through the high-layer or physical-layer signaling, or determined and configured by the network-side device for the first terminal through the high-layer or physical-layer signaling, or predetermined in the protocol.

Optionally, in the embodiment of the disclosure, when the uplink control information is the SR, at least one of the following applies.

Different SR configuration information or different SR sequences are used for indicating whether a sidelink resource requested by the first terminal is an initial transmission resource or a retransmission resource.

Different SR configuration information or different SR sequences are used for indicating ID information of different second terminals that receive data on the requested sidelink resource and/or different HARQ process IDs.

In summary, in the apparatus for sending control information provided in the embodiment of the disclosure, the first terminal sends the uplink control information to the network-side device on the first uplink resource according to the received SFCI, such that the network-side device may distinguish whether the resource requested by the first terminal is for initial transmission or retransmission, and further for initial transmission or retransmission of which HARQ process of which second terminal, so as to further implement resource scheduling more reasonably.

It is to be noted that the apparatus for sending control information provided in the embodiment of the disclosure is an apparatus capable of executing the method for sending control information, all embodiments of the method for sending control information are applicable to the apparatus, and the same or similar beneficial effects may be achieved.

An embodiment of the disclosure also provides a computer-readable storage medium having stored thereon a computer program. The program is executed by a processor to implement each process in the embodiment of the method for sending control information. The same technical effects may be achieved. To avoid repetitions, elaborations are omitted herein. The computer-readable storage medium is, for example, a Read-Only Memory (ROM), a Random Access Memory (RAM), a magnetic disk, or an optical disk.

Figure 6:
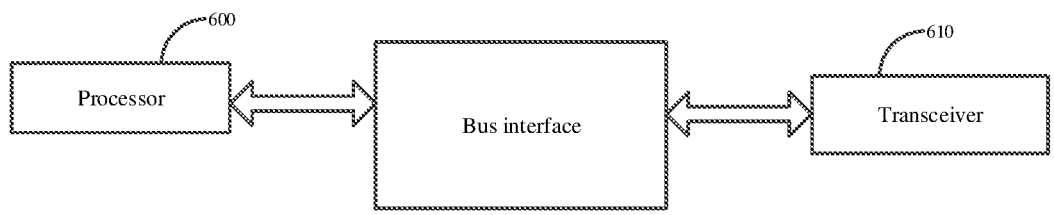
FIG. 6 is a structure diagram of a network-side device according to an embodiment of the disclosure.

As shown in FIG. 6, an embodiment of the disclosure also provides a network-side device, which includes a processor 600 and a transceiver 610. The processor 600 is configured to control the transceiver 610 to receive uplink control information sent by a first terminal on a first uplink resource. The uplink control information includes at least one of:

SFCI received by the first terminal from at least one second terminal;

first information generated by the first terminal according to the SFCI received from the at least one second terminal and used for indicating whether the second terminal correctly receives sidelink data sent by the first terminal;

a BSR carrying the SFCI received by the first terminal from the at least one second terminal; or an SR.

Optionally, in the embodiment of the disclosure, the transceiver 610 is further configured to send high-layer signaling to the first terminal, the high-layer signaling being used for configuring an available value set of at least one piece of information.

The information includes at least one of:

slot information indicating the number of gap slots between a slot used for uplink transmission of the uplink control information and a target slot, the target slot being a slot used by the first terminal to receive physical-layer downlink control signaling for scheduling data transmission from the first terminal to the second terminal, or a slot used by the first terminal to send SCI, or a slot used by the first terminal to send the sidelink data, or a slot used by the first terminal to receive the SFCI from the second terminal;

symbol information indicating a symbol occupied by the uplink control information in the occupied slot;

resource block information indicating a PRB occupied by the uplink control information in the occupied slot;

format information indicating a PUCCH format available for the uplink control information; or PUCCH resource information indicating an ID of a PUCCH resource occupied by the uplink control information.

Optionally, in the embodiment of the disclosure, the transceiver 610 is further configured to send physical-layer downlink control signaling to the first terminal, the physical-layer downlink control signaling indicating an available value in the available value set configured by the high-layer signaling.

Optionally, in the embodiment of the disclosure, when at least two pieces of SFCI are received and the uplink control information includes the received SFCI or the first information, one of the following applies.

The uplink control information includes the at least two pieces of SFCI, ID information of a respective second terminal corresponding to each piece of SFCI, and a respective HARQ process ID corresponding to each piece of SFCI.

The uplink control information includes at least two pieces of first information, ID information of a respective second terminal corresponding to each piece of first information, and a respective HARQ process ID corresponding to each piece of first information.

The uplink control information includes the at least two pieces of SFCI, positions of the SFCI corresponding to different HARQ processes of different second terminals in the uplink control information being different.

The uplink control information includes the at least two pieces of first information, positions of the first information corresponding to different HARQ processes of different second terminals in the uplink control information being different.

Optionally, in the embodiment of the disclosure, at least one of the following applies. The positions of the SFCI corresponding to different HARQ processes of different second terminals in the uplink control information are determined and reported by the first terminal to the network-side device through high-layer or physical-layer signaling, or determined and configured by the network-side device for the first terminal through high-layer or physical-layer signaling, or predetermined in a protocol.

The positions of the first information corresponding to different HARQ processes of different second terminals in the uplink control information are determined and reported by the first terminal to the network-side device through the high-layer or physical-layer signaling, or determined and configured by the network-side device for the first terminal through the high-layer or physical-layer signaling, or predetermined in the protocol.

Optionally, in the embodiment of the disclosure, when the uplink control information is the SR, at least one of the following applies.

Different SR configuration information or different SR sequences are used for indicating whether a sidelink resource requested by the first terminal is an initial transmission resource or a retransmission resource.

Different SR configuration information or different SR sequences are used for indicating ID information of different second terminals that receive data on the requested sidelink resource and/or different HARQ process IDs.

In summary, in the network-side device provided in the embodiment of the disclosure, the network-side device receives the uplink control information on the first uplink resource, and the network-side device may distinguish whether the resource requested by the first terminal is for initial transmission or retransmission and further for initial transmission or retransmission of which HARQ process of which second terminal according to the received uplink control information, so as to further implement resource scheduling more reasonably.

It is to be noted that the network-side device provided in the embodiment of the disclosure is a network-side device capable of executing the method for receiving control information, all embodiments of the method for receiving control information are applicable to the network-side device, and the same or similar beneficial effects may be achieved.

Figure 7:
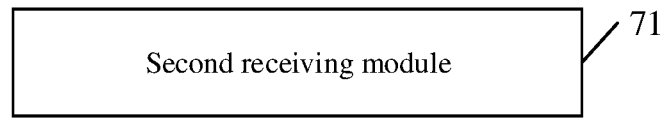
FIG. 7 is a structure diagram of an apparatus for receiving control information according to an embodiment of the disclosure.

As shown in FIG. 7, an embodiment of the disclosure also provides an apparatus for receiving control information, which is applied to a network-side device and includes a second receiving module 71.

The second receiving module 71 is configured to receive uplink control information sent by a first terminal on a first uplink resource. The uplink control information includes at least one of:
- SFCI received by the first terminal from at least one second terminal;
- first information generated by the first terminal according to the SFCI received from the at least one second terminal and used for indicating whether the second terminal correctly receives sidelink data sent by the first terminal;
- a BSR carrying the SFCI received by the first terminal from the at least one second terminal; or
- an SR.

Optionally, in the embodiment of the disclosure, the apparatus further includes a second sending module.

The second sending module is configured to send high-layer signaling to the first terminal, the high-layer signaling being used for configuring an available value set of at least one piece of information.

The information includes at least one of:
- slot information indicating the number of gap slots between a slot used for uplink transmission of the uplink control information and a target slot, the target slot being a slot used by the first terminal to receive physical-layer downlink control signaling for scheduling data transmission from the first terminal to the second terminal, or a slot used by the first terminal to send SCI, or a slot used by the first terminal to send the sidelink data, or a slot used by the first terminal to receive the SFCI from the second terminal;
- symbol information indicating a symbol occupied by the uplink control information in the occupied slot;
- resource block information indicating a PRB occupied by the uplink control information in the occupied slot;
- format information indicating a PUCCH format available for the uplink control information; or
- PUCCH resource information indicating an ID of a PUCCH resource occupied by the uplink control information.

Optionally, in the embodiment of the disclosure, the apparatus further includes a third sending module.

The third sending module is configured to send physical-layer downlink control signaling to the first terminal, the physical-layer downlink control signaling indicating an available value in the available value set configured by the high-layer signaling.

Optionally, in the embodiment of the disclosure, when the first terminal receives at least two pieces of SFCI and the uplink control information includes the received SFCI or the first information, one of the following applies.

The uplink control information includes the at least two pieces of SFCI, ID information of a respective second terminal corresponding to each piece of SFCI, and a respective HARQ process ID corresponding to each piece of SFCI.

The uplink control information includes at least two pieces of first information, ID information of a respective second terminal corresponding to each piece of first information, and a respective HARQ process ID corresponding to each piece of first information.

The uplink control information includes the at least two pieces of SFCI, positions of the SFCI corresponding to different HARQ processes of different second terminals in the uplink control information being different.

The uplink control information includes the at least two pieces of first information, positions of the first information corresponding to different HARQ processes of different second terminals in the uplink control information being different.

Optionally, in the embodiment of the disclosure, at least one of the following applies. The positions of the SFCI corresponding to different HARQ processes of different second terminals in the uplink control information are determined and reported by the first terminal to the network-side device through high-layer or physical-layer signaling, or determined and configured by the network-side device for the first terminal through high-layer or physical-layer signaling, or predetermined in a protocol.

The positions of the first information corresponding to different HARQ processes of different second terminals in the uplink control information are determined and reported by the first terminal to the network-side device through the high-layer or physical-layer signaling, or determined and configured by the network-side device for the first terminal through the high-layer or physical-layer signaling, or predetermined in the protocol.

Optionally, in the embodiment of the disclosure, when the uplink control information is the SR, at least one of the following applies.

Different SR configuration information or different SR sequences are used for indicating whether a sidelink resource requested by the first terminal is an initial transmission resource or a retransmission resource.

Different SR configuration information or different SR sequences are used for indicating ID information of different second terminals that receive data on the requested sidelink resource and/or different HARQ process IDs.

In summary, in the apparatus for receiving control information provided in the embodiment of the disclosure, the network-side device receives the uplink control information on the first uplink resource, and the network-side device may distinguish whether the resource requested by the first terminal is for initial transmission or retransmission and further for initial transmission or retransmission of which HARQ process of which second terminal according to the received uplink control information, so as to further implement resource scheduling more reasonably.

It is to be noted that the apparatus for receiving control information provided in the embodiment of the disclosure is an apparatus capable of executing the method for receiving control information, all embodiments of the method for receiving control information are applicable to the apparatus, and the same or similar beneficial effects may be achieved.

An embodiment of the disclosure also provides a computer-readable storage medium having stored thereon a computer program. The program is executed by a processor to implement each process in the embodiment of the method for receiving control information. The same technical effects may be achieved. To avoid repetitions, elaborations are omitted herein. The computer-readable storage medium is, for example, a ROM, a RAM, a magnetic disk, or an optical disk.

Those skilled in the art will understand that the embodiment of the application may be provided as a method, a system, or a computer program product. Therefore, the application may adopt a form of pure hardware embodiment, pure software embodiment, or combined software and hardware embodiment. Moreover, the application may adopt a form of computer program product implemented in one or more computer-readable storage media (including, but not limited to, a disk memory, an optical memory, etc.) including computer-available program codes.

The application is described with reference to flowcharts and/or block diagrams of the method, device (system), and computer program product according to the embodiments of the application. It is to be understood that each flow and/or block in the flowcharts and/or the block diagrams and combinations of the flows and/or blocks in the flowcharts and/or the block diagrams may be implemented by computer program instructions. These computer program instructions may be provided for a processor of a universal computer, a dedicated computer, an embedded processor, or another programmable data processing device to generate a machine, so that a device for implementing a function specified in one flow or multiple flows in the flowcharts and/or one block or multiple blocks is generated by the instructions executed through the processor of the computer or the other programmable data processing device.

These computer program instructions may also be stored in a computer-readable storage medium capable of guiding the computer or the other programmable data processing device to work in a specific manner, so that a product including an instruction apparatus may be generated by the instructions stored in the computer-readable storage medium, the instruction apparatus implementing the function specified in one flow or multiple flows in the flowcharts and/or one block or multiple blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or multiple flows in the flowcharts and/or one block or multiple blocks in the block diagrams are provided by the instructions executed on the computer or the other programmable data processing device.

It can be understood that these embodiments described in the embodiments of the disclosure may be implemented by hardware, software, firmware, middleware, a microcode, or a combination thereof. In case of implementation with the hardware, the module, submodule, unit, subunit, etc., may be implemented in one or more Application Specific Integrated Circuits (ASICs), Digital Signal Processors (DSPs), DSP Devices (DSPDs), Programmable Logic Devices (PLDs), Field-Programmable Gate Arrays (FPGAs), universal processors, controllers, microcontrollers, microprocessors, other electronic units configured to execute the functions in the disclosure, or combinations thereof.

In case of implementation with the software, the technology as described in the embodiments of the disclosure may be implemented through the modules (for example, processes and functions) executing the functions in the embodiments of the disclosure. A software code may be stored in the memory and executed by the processor. The memory may be implemented in the processor or outside the processor.

Described above are the optional implementations of the disclosure. It is to be noted that those of ordinary skill in the art may further make a plurality of improvements and embellishments without departing from the principle of the disclosure, and these improvements and embellishments shall also fall within the scope of protection of the disclosure.

The invention claimed is:

1. A method for sending control information, applied to a first terminal and comprising:
  receiving Sidelink Feedback Control Information (SFCI) from at least one second terminal; and
  sending uplink control information on a first uplink resource according to the received SFCI, wherein the uplink control information comprises at least one of: the received SFCI; first information generated according to the received SFCI and indicating whether the at least one second terminal correctly receives sidelink data sent by the first terminal; a Buffer Status Report (BSR) carrying the received SFCI; or a Scheduling Request (SR);
  wherein the method further comprises:
    determining the first uplink resource according to at least one of the following information:
      slot information indicating a number of gap slots between a slot used for the uplink control information and a target slot, the target slot being a slot used by the first terminal to receive physical-layer downlink control signaling for scheduling data transmission from the first terminal to the at least one second terminal, or a slot used by the first terminal to send Sidelink Control Information (SCI), or a slot used by the first terminal to send the sidelink data, or a slot used by the first terminal to receive the SFCI from the at least one second terminal;
      resource block information indicating a Physical Resource Block (PRB) occupied by the uplink control information in an occupied slot;
      format information indicating a Physical Uplink Control Channel (PUCCH) format available for the uplink control information; or
      PUCCH resource information indicating an Identity (ID) of a PUCCH resource occupied by the uplink control information.

2. The method of claim 1, wherein determining the first uplink resource according to the at least one of the following information comprises:
  determining an available value set of at least one piece of information according to a protocol or a configuration of high-layer signaling sent by a network-side device;
  receiving the physical-layer downlink control signaling from the network-side device, the physical-layer downlink control signaling indicating an available value in the available value set configured by the high-layer signaling or predetermined in the protocol; and
  determining the first uplink resource according to the available value indicated by the physical-layer downlink control signaling.

3. The method of claim 1, wherein determining the first uplink resource according to the at least one of the following information comprises:
- determining an available value of at least one piece of information according to a target resource, and determining the first uplink resource according to the determined available value,
- wherein the target resource comprises one of:
  - a resource used by the first terminal to receive the physical-layer downlink control signaling for scheduling data transmission from the first terminal to the at least one second terminal;
  - a resource used by the first terminal to send the SCI;
  - a resource used by the first terminal to send the sidelink data; or
  - a resource used by the first terminal to receive the SFCI from the at least one second terminal.

4. The method of claim 1, wherein determining the first uplink resource according to the at least one of the following information comprises:
- determining an available value set of at least one piece of information according to a protocol or a configuration of high-layer signaling sent by a network-side device; and
- determining an available value in the available value set configured by the high-layer signaling or predetermined in the protocol according to a target resource, and determining the first uplink resource according to the determined available value,
- wherein the target resource comprises one of:
  - a resource used by the first terminal to receive the physical-layer downlink control signaling for scheduling data transmission from the first terminal to the at least one second terminal;
  - a resource used by the first terminal to send the SCI;
  - a resource used by the first terminal to send the sidelink data; or
  - a resource used by the first terminal to receive the SFCI from the at least one second terminal.

5. The method of claim 1, wherein when at least two pieces of SFCI are received and the uplink control information comprises the received SFCI or the first information,
- the uplink control information comprises the received at least two pieces of SFCI, ID information of a respective second terminal corresponding to each piece of the received at least two pieces of SFCI, and a respective Hybrid Automatic Repeat reQuest (HARQ) process ID corresponding to each piece of the received at least two pieces of SFCI;
- or,
- the uplink control information comprises generated at least two pieces of first information, ID information of a respective second terminal corresponding to each piece of the generated at least two pieces of first information, and a respective HARQ process ID corresponding to each piece of the generated at least two pieces of first information;
- or,
- the uplink control information comprises the received at least two pieces of SFCI, positions of the SFCI corresponding to different HARQ processes of different second terminals in the uplink control information being different;
- or,
- the uplink control information comprises the generated at least two pieces of first information, positions of the first information corresponding to different HARQ processes of different second terminals in the uplink control information being different.

6. The method of claim 5, wherein at least one of the following applies:
- the positions of the SFCI corresponding to different HARQ processes of different second terminals in the uplink control information are determined and reported by the first terminal to a network-side device through high-layer or physical-layer signaling, or determined and configured by the network-side device for the first terminal through the high-layer or physical-layer signaling, or predetermined in a protocol; or
- the positions of the first information corresponding to different HARQ processes of different second terminals in the uplink control information are determined and reported by the first terminal to the network-side device through the high-layer or physical-layer signaling, or determined and configured by the network-side device for the first terminal through the high-layer or physical-layer signaling, or predetermined in the protocol.

7. The method of claim 1, wherein when the uplink control information is the SR, at least one of the following applies:
- different SR configuration information or different SR sequences are used for indicating whether a sidelink resource requested by the first terminal is an initial transmission resource or a retransmission resource; or
- different SR configuration information or different SR sequences are used for indicating ID information of at least one of different second terminals that receive data on the requested sidelink resource or different HARQ process IDs.

8. A method for receiving control information, applied to a network-side device and comprising:
- receiving uplink control information sent by a first terminal on a first uplink resource, the uplink control information comprising at least one of: Sidelink Feedback Control Information (SFCI) received by the first terminal from at least one second terminal; first information generated by the first terminal according to the SFCI received from the at least one second terminal and indicating whether the at least one second terminal correctly receives sidelink data sent by the first terminal; a Buffer Status Report (BSR) carrying the SFCI received by the first terminal from the at least one second terminal; or a Scheduling Request (SR);
- wherein the method further comprises:
  - sending high-layer signaling to the first terminal, the high-layer signaling being used for configuring an available value set of at least one piece of information, wherein the at least one piece of information comprises at least one of:
    - slot information indicating a number of gap slots between a slot used for uplink transmission of the uplink control information and a target slot, the target slot being a slot used by the first terminal to receive physical-layer downlink control signaling for scheduling data transmission from the first terminal to the at least one second terminal, or a slot used by the first terminal to send Sidelink Control Information (SCI), or a slot used by the first terminal to send the sidelink data, or a slot used by the first terminal to receive the SFCI from the at least one second terminal;
    - resource block information indicating a Physical Resource Block (PRB) occupied by the uplink control information in an occupied slot;

format information indicating a Physical Uplink Control Channel (PUCCH) format available for the uplink control information; or PUCCH resource information indicating an Identity (ID) of a PUCCH resource occupied by the uplink control information.

9. The method of claim 8, further comprising:
sending the physical-layer downlink control signaling to the first terminal, the physical-layer downlink control signaling indicating an available value in the available value set configured by the high-layer signaling.

10. The method of claim 8, wherein when the first terminal receives at least two pieces of SFCI and the uplink control information comprises the received SFCI or the first information, the uplink control information comprises the at least two pieces of SFCI, ID information of a respective second terminal corresponding to each piece of the at least two pieces of SFCI, and a respective Hybrid Automatic Repeat reQuest (HARQ) process ID corresponding to each piece of the at least two pieces of SFCI;

or, the uplink control information comprises at least two pieces of first information, ID information of a respective second terminal corresponding to each piece of the at least two pieces of first information, and a respective HARQ process ID corresponding to each piece of the at least two pieces of first information;

or, the uplink control information comprises the at least two pieces of SFCI, positions of the SFCI corresponding to different HARQ processes of different second terminals in the uplink control information being different;

or, the uplink control information comprises the at least two pieces of first information, positions of the first information corresponding to different HARQ processes of different second terminals in the uplink control information being different.

11. The method of claim 10, wherein at least one of the following applies:

the positions of the SFCI corresponding to different HARQ processes of different second terminals in the uplink control information are determined and reported by the first terminal to the network-side device through high-layer or physical-layer signaling, or determined and configured by the network-side device for the first terminal through the high-layer or physical-layer signaling, or predetermined in a protocol; or the positions of the first information corresponding to different HARQ processes of different second terminals in the uplink control information are determined and reported by the first terminal to the network-side device through the high-layer or physical-layer signaling, or determined and configured by the network-side device for the first terminal through the high-layer or physical-layer signaling, or predetermined in the protocol.

12. The method of claim 8, wherein when the uplink control information is the SR, at least one of the following applies:

different SR configuration information or different SR sequences are used for indicating whether a sidelink resource requested by the first terminal is an initial transmission resource or a retransmission resource; or different SR configuration information or different SR sequences are used for indicating ID information of at least one of different second terminals that receive data on the requested sidelink resource or different HARQ process IDs.

13. A terminal, the terminal being a first terminal and comprising a processor and a transceiver, wherein the processor is configured to control the transceiver to:

receive Sidelink Feedback Control Information (SFCI) from at least one second terminal; and send uplink control information on a first uplink resource according to the received SFCI, wherein the uplink control information comprises at least one of: the received SFCI; first information generated according to the received SFCI and indicating whether the at least one second terminal correctly receives sidelink data sent by the first terminal; a Buffer Status Report (BSR) carrying the received SFCI; or a Scheduling Request (SR);

wherein the processor is further configured to:
determine the first uplink resource according to at least one of the following information:

slot information indicating a number of gap slots between a slot used for the uplink control information and a target slot, the target slot being a slot used by the first terminal to receive physical-layer downlink control signaling for scheduling data transmission from the first terminal to the at least one second terminal, or a slot used by the first terminal to send Sidelink Control Information (SCI), or a slot used by the first terminal to send the sidelink data, or a slot used by the first terminal to receive the SFCI from the at least one second terminal;

resource block information indicating a Physical Resource Block (PRB) occupied by the uplink control information in an occupied slot;

format information indicating a Physical Uplink Control Channel (PUCCH) format available for the uplink control information; or PUCCH resource information indicating an Identity (ID) of a PUCCH resource occupied by the uplink control information.

14. The terminal of claim 13, wherein the transceiver is further configured to:

determine an available value set of at least one piece of information according to a protocol or a configuration of high-layer signaling sent by a network-side device, and receive the physical-layer downlink control signaling from the network-side device, the physical-layer downlink control signaling indicating an available value in the available value set configured by the high-layer signaling or predetermined in the protocol; and the processor is further configured to:
determine the first uplink resource according to the available value indicated by the physical-layer downlink control signaling.

15. A network-side device, comprising a processor and a transceiver, wherein the processor is configured to control the transceiver to:

receive uplink control information sent by a first terminal on a first uplink resource, the uplink control information comprising at least one of: Sidelink Feedback Control Information (SFCI) received by the first terminal from at least one second terminal; first information generated by the first terminal according to the SFCI received from the at least one second terminal and indicating whether the at least one second terminal correctly receives sidelink data sent by the first terminal; a Buffer Status Report (BSR) carrying the SFCI received by the first terminal from the at least one second terminal; or a Scheduling Request (SR);

wherein the processor is further configured to control the transceiver to:
- send high-layer signaling to the first terminal, the high-layer signaling being used for configuring an available value set of at least one piece of information, wherein the at least one piece of information comprises at least one of:
  - slot information indicating a number of gap slots between a slot used for uplink transmission of the uplink control information and a target slot, the target slot being a slot used by the first terminal to receive physical-layer downlink control signaling for scheduling data transmission from the first terminal to the at least one second terminal, or a slot used by the first terminal to send Sidelink Control Information (SCI), or a slot used by the first terminal to send the sidelink data, or a slot used by the first terminal to receive the SFCI from the at least one second terminal;
  - resource block information indicating a Physical Resource Block (PRB) occupied by the uplink control information in an occupied slot;
  - format information indicating a Physical Uplink Control Channel (PUCCH) format available for the uplink control information; or
  - PUCCH resource information indicating an Identity (ID) of a PUCCH resource occupied by the uplink control information.

* * * * *